United States Patent
Young

[15] 3,646,473
[45] Feb. 29, 1972

[54] CLAD GLASS LASER ROD

[72] Inventor: Charles Gilbert Young, Southeast Road, Storrs, Conn. 06268

[22] Filed: Apr. 10, 1969

[21] Appl. No.: 815,012

[52] U.S. Cl. .................. 331/94.5, 350/96 WG, 350/195 GN
[51] Int. Cl. ........................................ H01s 3/06, H01s 3/16
[58] Field of Search ................ 331/94.5; 350/175 GN, 96

[56]  References Cited

UNITED STATES PATENTS 3,356,966  12/1967  Miller ................................. 331/94.5
3,434,776  3/1969  Kern ................................. 331/94.5 X
3,408,131  10/1968  Kapany ............................. 330/4.3 X

*Primary Examiner*—Ronald L. Wibert
*Assistant Examiner*—R. J. Webster
*Attorney*—Lane, Aitken, Dunner & Ziems and William C. Nealon

[57]  ABSTRACT

The cladding of a clad glass laser rod is made very thin and has an index of refraction slightly higher than the index of refraction of the laser glass core.

8 Claims, 5 Drawing Figures

PATENTED FEB 29 1972

3,646,473

INVENTOR
CHARLES GILBERT YOUNG

BY William C. Nealon and
Lane, Aitken, Dunner & Ziems
ATTORNEYS

CLAD GLASS LASER ROD

BACKGROUND OF THE INVENTION

This invention relates to glass lasers and, more particularly, to glass laser rods with improved cladding.

In conventional glass lasers the laser glass is excited to a state in which it will amplify light by being irradiated with light generated by inert gas flashlamps. The light which excites the laser glass is referred to as "pump light," whereas the light amplified by the laser glass is referred to as "laser light." The laser glass is usually in the form of a rod and is designed to amplify laser light travelling through the rod parallel with the axis thereof or to generate and amplify a laser beam parallel with the axis of the rod. To suppress laser light which is not parallel with the axis, the laser rod is normally clad with a layer of material which absorbs light of the wavelength of the laser light, but which will transmit the pump light to the laser glass. This cladding in the laser rod systems of the prior art normally has a thickness equal to about 50 percent of the diameter of the laser glass core.

SUMMARY OF THE INVENTION

The present invention is based on the discovery that the cladding of the laser rod can be made very thin without adversely affecting the function of the cladding of suppressing off-axial light, whereas the very thin cladding has the advantage of facilitating cooling of the laser glass and permitting the laser glass core to have a greater cross sectional area in a construction in which the outer diameter of the composite structure of the core and cladding is limited. The cladding is selected to have an index of refraction slightly greater than the index of refraction of the laser core so that within normal fabrication tolerances a slightly lower index of refraction is not inadvertently obtained. A slightly lower index of refraction would cause total internal refraction at the interface between the cladding and the core and off-axial light which suffered this total internal reflection would not be suppressed by the cladding.

Accordingly, an object of the present invention is to provide an improved glass laser rod.

Another object of the present invention is to improve the cladding on a laser rod.

A further object of the present invention is to improve the cooling of the laser material in a clad laser rod.

A still further object of the present invention is to maximize the cross-sectional area of the laser glass core of a clad glass laser rod.

Further objects and advantages of the present invention will become readily apparent as the following detailed description of the invention unfolds and when taken in conjunction with the drawings.

BRIEF DESCRIPTION OF THE PREFERRED EMBODIMENTS

Figure 1:
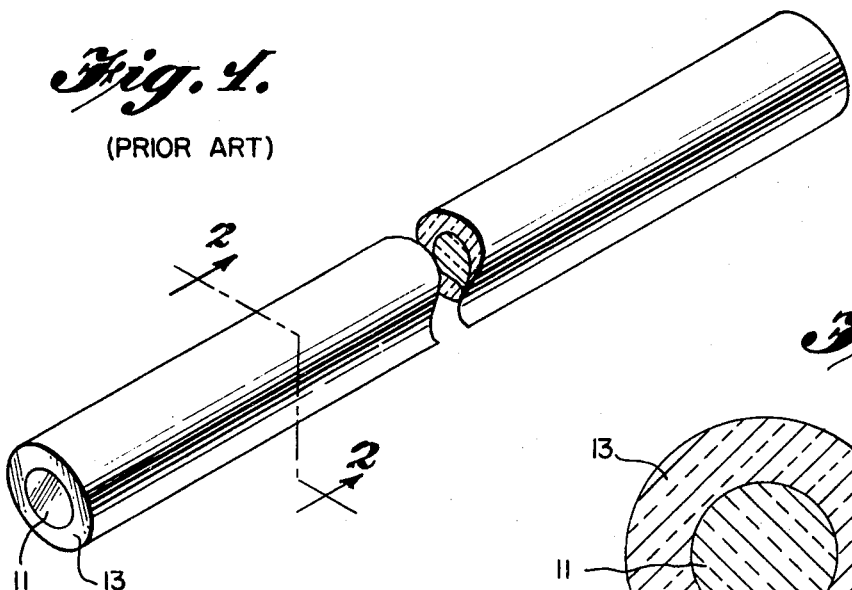
FIG. 1 is a perspective view of a clad glass laser rod of the prior art.
Figure 2:
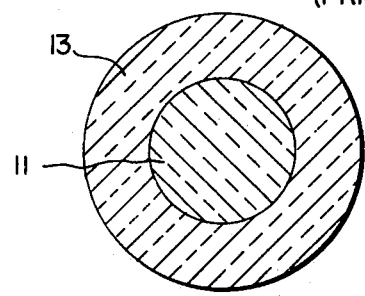
FIG. 2 is a sectional view taken along lines 2—2 of FIG. 1.

The clad laser rod of the prior art shown in FIG. 1 and 2 comprises a laser glass core 11 clad with a layer 13 which will absorb laser rays produced or amplified by the laser glass core 11. The cladding layer 13 is referred to simply as the cladding. The laser glass core for example may be neodymium doped glass in which case the laser light will have a wavelength of 1.06 microns. The cladding 13 may be samarium-doped glass which absorbs light of the wavelength of 1.06 microns, but which is transparent in the visible range and thus will transmit pump light to the laser glass core. As illustrated in FIGS. 1 and 2, the cladding 13 has a thickness equal to about 50 percent of the diameter of the laser glass core.

Figure 3:
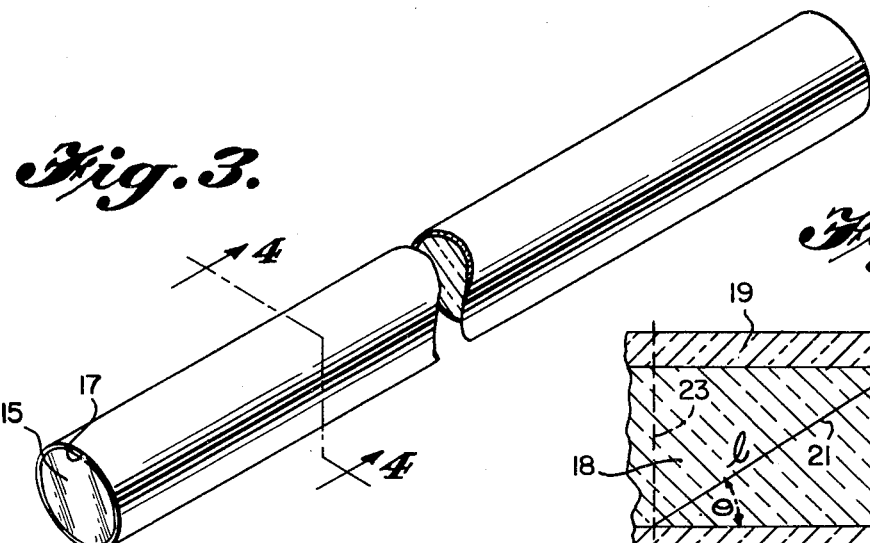
FIG. 3 is a perspective view of a clad glass laser rod of the present invention.
Figure 4:
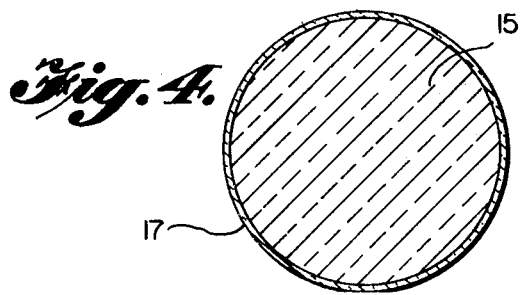
FIG. 4 is a sectional view taken along the lines 4—4 in FIG. 3.

The clad laser rod of the present invention shown in FIGS. 3 and 4 comprises a laser glass core 15, which also may be neodymium-doped glass, clad with a layer 17 which will absorb the wavelength of the laser light produced and amplified by the laser core but which is transparent to the pump light for exciting the laser core. The cladding 17 as the cladding in the prior art rod may be samarium-doped glass.

In accordance with the present invention the cladding 17 is made very thin so that its thickness is less than 5 percent of the diameter of the laser glass core and preferably has a thickness of about 0.5 percent of the diameter of the laser glass core.

The index of refraction of the cladding is selected to be slightly higher (e.g., about one part in a thousand higher) than the index of refraction of the laser glass core. This insures that within the normal manufacturing tolerances that there will be no chance that the cladding 17 has a lower index of refraction than the laser glass core. If the cladding had a lower index of refraction than the core, then off-axial light at low angles of incidence would experience total internal reflection at the interface between the core and the cladding and thus this off-axial light would not be suppressed by the cladding. The selection of a slightly higher index of refraction for the clad;ing than for the laser glass core insures that off-axial laser light enters the cladding and thus is suppressed by the cladding.

If the core and the cladding were perfectly symmetrical then an off-axial ray after entering the cladding and experiencing total internal reflection at the outer surface of the clad;ing would reenter the laser glass core. As a practical matter, however, slight asymmetries exist at the interface between the core and cladding and as a result some of the off-axial laser rays will remain in the cladding for more than one round trip, thus further increasing the effectiveness of the cladding in suppressing the off-axial light.

Figure 5:
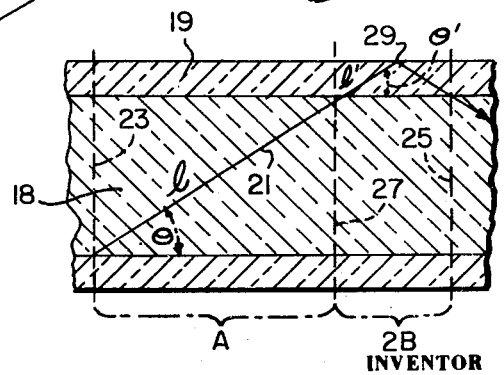
FIG. 5 is an axial sectional view of a portion of a clad laser rod illustrating a mathematical derivation.

In order to suppress the off-axial rays, the gain for the off-axial rays must be less than that for rays travelling through the core parallel with the core axis. This condition is analyzed with respect to FIG. 5, which is an axial section taken through a clad laser rod. In this Figure the laser core is designated by the reference number 18 and the cladding is designated by the reference number 19. The reference number 21 is the path of an off-axial meridional ray, which is an off-axial ray passing through the axis of the rod. In order for the off-axial meridional ray on path 21 to be suppressed, the gain for this ray must be less between the cross-sectional planes 23 and 25 than it is for laser rays parallel to axis of the laser rod as further transmission of the meridional ray on path 21 through the rod will duplicate the length of travel in the core relative to the length of travel in cladding until the ray is suppressed. The gain $G_1$ for a ray passing through the core 18 parallel with the rod axis between planes 23 and 25 will be:

$$G_1 = (e^{\beta A})(e^{2\beta B}) \quad (1)$$

in which $\beta$ is exponential gain coefficient in the laser glass core 18, $A$ is the distance between the plane 23 and a cross-sectional plane 27 passing the point at which the path 21 enters the cladding, and $2B$ is the distance between the planes 27 and 25. The gain $G_2$ for an off-axial ray on path 21 is:

$$G_2 = (e^{\beta l})(e^{-2\alpha l'}) \quad (2)$$

in which $\alpha$ is the exponential loss coefficient of the cladding and $l$ is length of the path 21 between the planes 23 and 27 or in other words in the laser core 18 and $l'$ is the length of the path 21 between the plane 27 and the point 29 where the off-axial ray is reflected from the outer surface of the cladding, $2l'$ being the length of the path 21 in the cladding 19. Thus, for suppression of the off-axial ray:

$$(e^{\beta A})(e^{2\beta B}) > (e^{\beta l})(e^{-2\alpha l'}) \quad (3)$$

or $$e^{\beta A + 2\beta B} > e^{\beta l - 2\alpha l'} \quad (4)$$

or $$\beta A + 2\beta B > l - 2\alpha l' \quad (5)$$

$A$ and $B$ can be expressed as follows:

$$A = l \cos\Theta; \quad (6)$$

and $$B = l' \cos\Theta'. \quad (7)$$

in which $\Theta$ is angle of the path 21 in the core with respect to axis and $\Theta'$ is the angle of the path 21 in the cladding with respect to the axis. For a slightly higher index of refraction in the cladding than in the core, $\Theta$ is approximately equal to $\Theta'$ so expression (5) becomes:

$$\beta l \cos\Theta + 2\beta l' \cos\Theta > \beta l - 2\alpha l'. \quad (8)$$

The ratio of the cladding thickness $d$ to the core diameter $c$ is related to $A$, $B$, $l$ and $l'$ as follows:

$$A/B = l/l' = d/c. \quad (9)$$
$$l' = l\, c/d. \quad (10)$$

Substituting for $l'$ in expression (8), the following expression results:

$$(11) \quad l\left(\beta \cos\theta + 2\beta \frac{c}{d} \cos\theta\right) > l\left(\beta - 2\alpha \frac{c}{d}\right)$$

or $$(12) \quad \beta \cos\theta \left(1 + 2\frac{c}{d}\right) > \left(\beta - 2\alpha \frac{c}{d}\right)$$

Expression (12) defines the condition for the suppression of off-axial meridional rays and shows that the cladding may be arbitrarily thin and off-axial meridional rays will still be suppressed at small angles $\Theta$. Off-axial rays at large angles $\Theta$ will not experience total internal reflection at the outer surface of the cladding and, accordingly, do not need to be suppressed. Skew rays, which are rays which do not pass through the axis, have a longer path in the cladding relative to the path in the laser core so if the meridional off-axial rays are suppressed the skew rays will be suppressed. Thus, the cladding may be made arbitrarily thin and it will still be effective in suppressing off-axial rays. On the other hand, the thinner the layer of cladding the lower will be the thermal impedance of the cladding and the greater will be the area of laser core cross section for a fixed outside diameter. As a practical matter, reducing the cladding thickness to below 0.5 percent of the core diameter does not gain enough to offset difficulty in fabrication. Accordingly, in the preferred embodiment the cladding thickness is about equal to 0.5 percent of the diameter of the laser core.

The very thin cladding of the present invention functions equally as well as the cladding of the price art to suppress off axial light, and yet the laser core can be cooled much more easily than the laser rods of the prior art due to the reduced thermal impedance of the cladding and, in addition, the cross-sectional area of the laser core can be made substantially larger for a given outside diameter than in the laser rods of the prior art.

I claim:

1. A clad laser rod comprising a cylindrical core of laser material clad in a layer of material which is absorptive of light at the wavelength amplified by the material of said laser core but which is transmissive to light of the wavelength which will excite said laser core to a state in which it will amplify light, said layer having a thickness less than 5 percent of the diameter of said core and having an index of refraction at least as high as said core.

2. A clad laser rod as recited in claim 1 wherein said laser material is laser glass.

3. A clad laser rod as recited in claim 1 wherein said layer has a higher index of refraction than said cylindrical core.

4. A clad laser rod as recited in claim 3 wherein said laser material is laser glass.

5. A clad laser rod as recited in claim 1 wherein the thickness of said layer is about 0.5 percent of the diameter of said rod.

6. A clad laser rod as recited in claim 5 wherein said laser material is laser glass.

7. A clad laser rod as recited in claim 5 wherein said layer has a higher index of refraction than said cylindrical core.

8. A clad laser rod as recited in claim 7 wherein said laser material is laser glass.

* * * * *